(12) United States Patent
Nakano et al.

(10) Patent No.: US 8,768,136 B2
(45) Date of Patent: Jul. 1, 2014

(54) FIBER OPTIC CONNECTOR/DUST COVER ORGANIZER

(75) Inventors: Masakazu Nakano, Hummelstown, PA (US); Jason Miller, Dauphin, PA (US)

(73) Assignee: Yazaki North America, Inc., Canton, MI (US)

( * ) Notice: Subject to any disclaimer, the term of this patent is extended or adjusted under 35 U.S.C. 154(b) by 227 days.

(21) Appl. No.: 13/231,768

(22) Filed: Sep. 13, 2011

(65) Prior Publication Data

US 2013/0064520 A1     Mar. 14, 2013

(51) Int. Cl.
*G02B 6/00*     (2006.01)
(52) U.S. Cl.
USPC .......................................................... 385/139
(58) Field of Classification Search
USPC .......................................................... 385/139
See application file for complete search history.

(56) References Cited

U.S. PATENT DOCUMENTS

2009/0074372 A1*   3/2009   Solheid et al. ................ 385/135
2010/0310226 A1    12/2010   Wakileh et al.

* cited by examiner

*Primary Examiner* — Jerry Blevins
(74) *Attorney, Agent, or Firm* — Fox Rothschild LLP

(57) ABSTRACT

A device 10 for organizing an array of optical fiber cables (14) terminated with fiber optic connectors (20). The device includes a base plate (22) having a plurality of mounting sites (24) configured to receive a like plurality of dust covers (20) for the respective fiber optic connectors (18). Two or more base plates (22) may be stacked through use of stacking spacers (42) to increase the number of mounting sites (24). The device 10 maintains the array of optical fiber cables during manufacture, shipping and handling, eliminating snarling of the individual optical fiber cables (14).

16 Claims, 7 Drawing Sheets

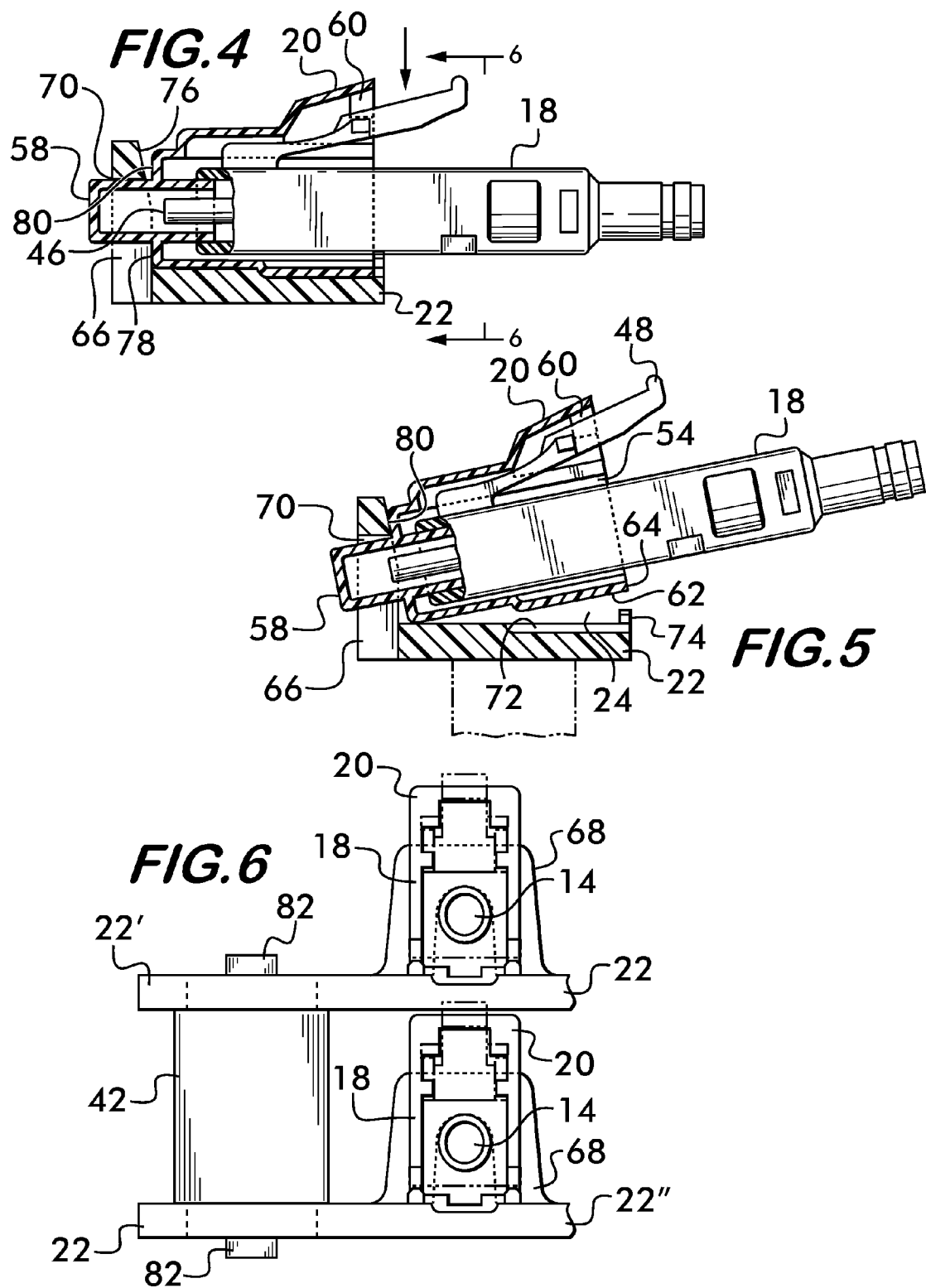

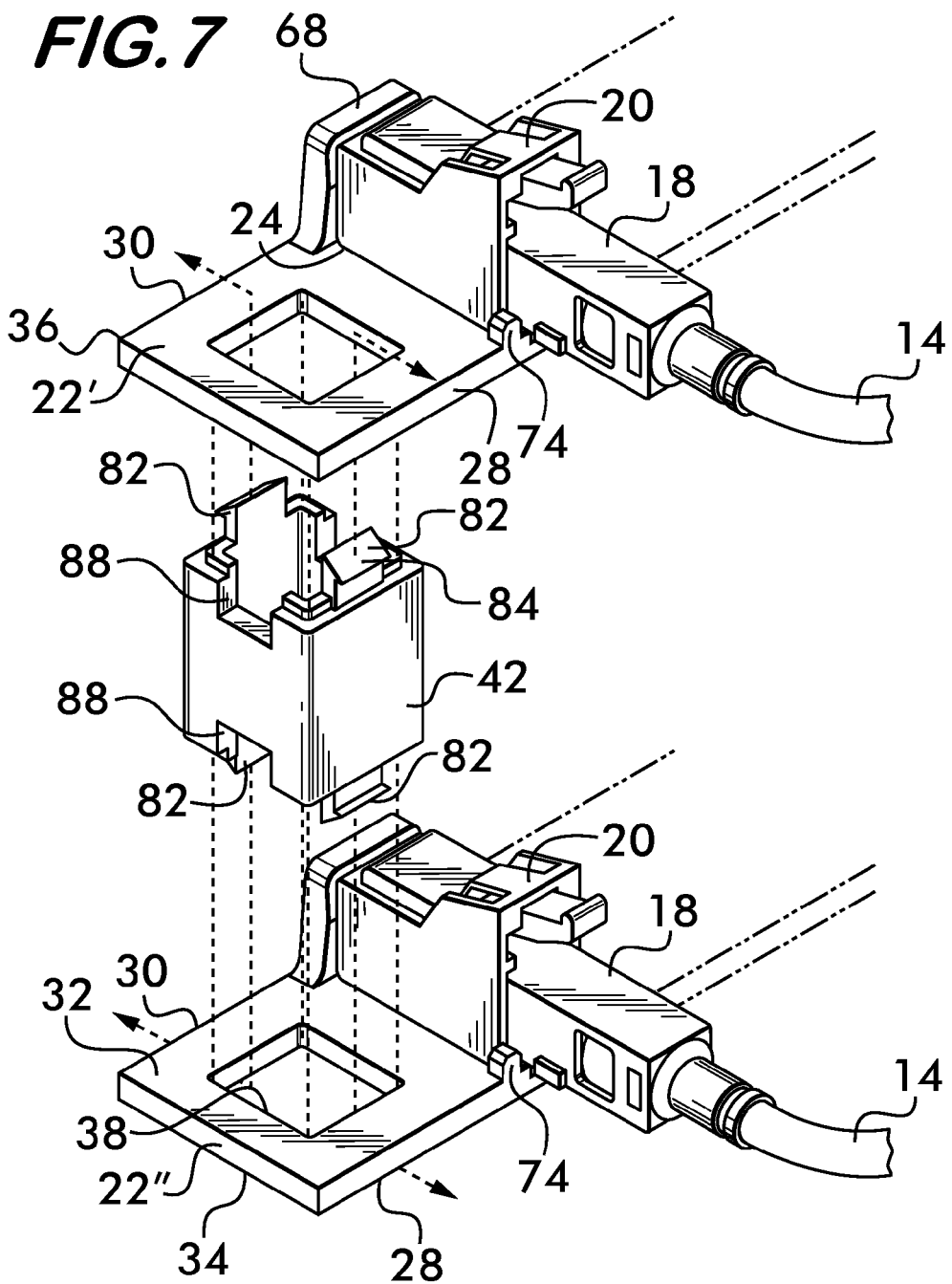

FIBER OPTIC CONNECTOR/DUST COVER ORGANIZER

BACKGROUND OF THE INVENTION

The present invention relates to the field of optical fibers and more particularly to organizers therefor.

Optical fiber cables are commonly bundled for convenient routing over distance. As is known in the art, the ends of the cables are separated from each other and terminated by respective fiber optic connectors. There can be numerous cables forming a single bundle. Accordingly, it is not uncommon for the end lengths of the optical fiber cables to become entangled and snarled during manufacturing, shipping and handling, whereby the customer must untangle them to install the cable array to other optical fiber cables or devices.

Fiber optic connectors are well known, as are dust covers which are removably affixable to coupling ends of the fiber optic connectors for protection of the otherwise exposed optical fiber end. The fiber optic connectors are easily removed from the dust cover for coupling to a complementary fiber optic connector or other device. Mechanisms for removably securing dust covers to fiber optic connectors are known. Also known are devices for organizing fiber optic connectors to prevent entanglement. Certain known organizers are disclosed in U.S. Patent Publication 2010/0310226. It is desirable to provide an improved connector organizing device that can be used to avoid entanglement of the fiber optic cables and the connectors during the manufacturing process, packaging, shipment and installation, while also protecting the fiber optic connectors.

SUMMARY OF THE INVENTION

Briefly, the present invention provides a device for organizing an array of fiber optic connectors by receiving dust covers for the fiber optic connectors. The device includes an elongated base plate that defines an array of mounting sites for retaining the fiber optic connector dust covers thereto, and which base plate has first and second ends. Each of the mounting sites is configured to receive one of the dust covers such that the dust covers are removably mountable at the sites to the base plate. At each mounting site, a dust cover is mountable in a manner permitting unmounting and removal thereof, when desired. When fiber optic connectors are removably coupled to respective dust covers mounted on the device, the fiber optic connectors are also held in an organized array, as are the optical fiber cables to which the connectors are terminated. The device enables the optical fiber ends to be held in an organized array during shipping and handling thereof, and is additionally useful during manufacturing and assembly, as well.

In a preferred embodiment, the device includes an elongated base plate configured to define an array of mounting sites at which respective dust covers may be removably mounted, such as in a friction fit or a snap fit. Preferably, the sites are arrayed in a row, such as a horizontal single row, and also, preferably, the dust covers face a common direction when so mounted. Another advantage of the present invention is that a fiber optic connector may be affixed to, or removable from, a respective dust cover while the dust cover remains affixed to the base plate.

The elongated base plate may be assembled to another such base plate to define a two-row array, such as by using a pair of stacking spacers mountable to respective ends of the two base plates, whereby the stacked base plates are parallel to and vertically spaced from each other. Thereby, the terminated optical fiber cables are arrayed in two rows. Similarly, additional base plates may be assembled thereto for multi-row arrays. Each of the pair of stacking spacers latches to corresponding latching sections of the base plates at a respective end of each base plate.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 4 is an enlarged view of a fiber optic connector mounted to a respective dust cover which is secured to at a respective mounting site of the organizing device;

FIG. 5 is a view similar to FIG. 4 and showing a fiber optic connector/dust cover assembly being mounted to or removed from a mounting site of the organizing device;

FIG. 6, taken along line 6-6 of FIG. 4, illustrates an end of a stack of two organizers of the present invention, and showing a stacking spacer of the present invention securing the organizer ends to each other;

FIG. 7 is an exploded view of the end of the stack of FIG. 6, showing details of the stacking spacer of the present invention;

DETAILED DESCRIPTION OF THE INVENTION

Figure 1:
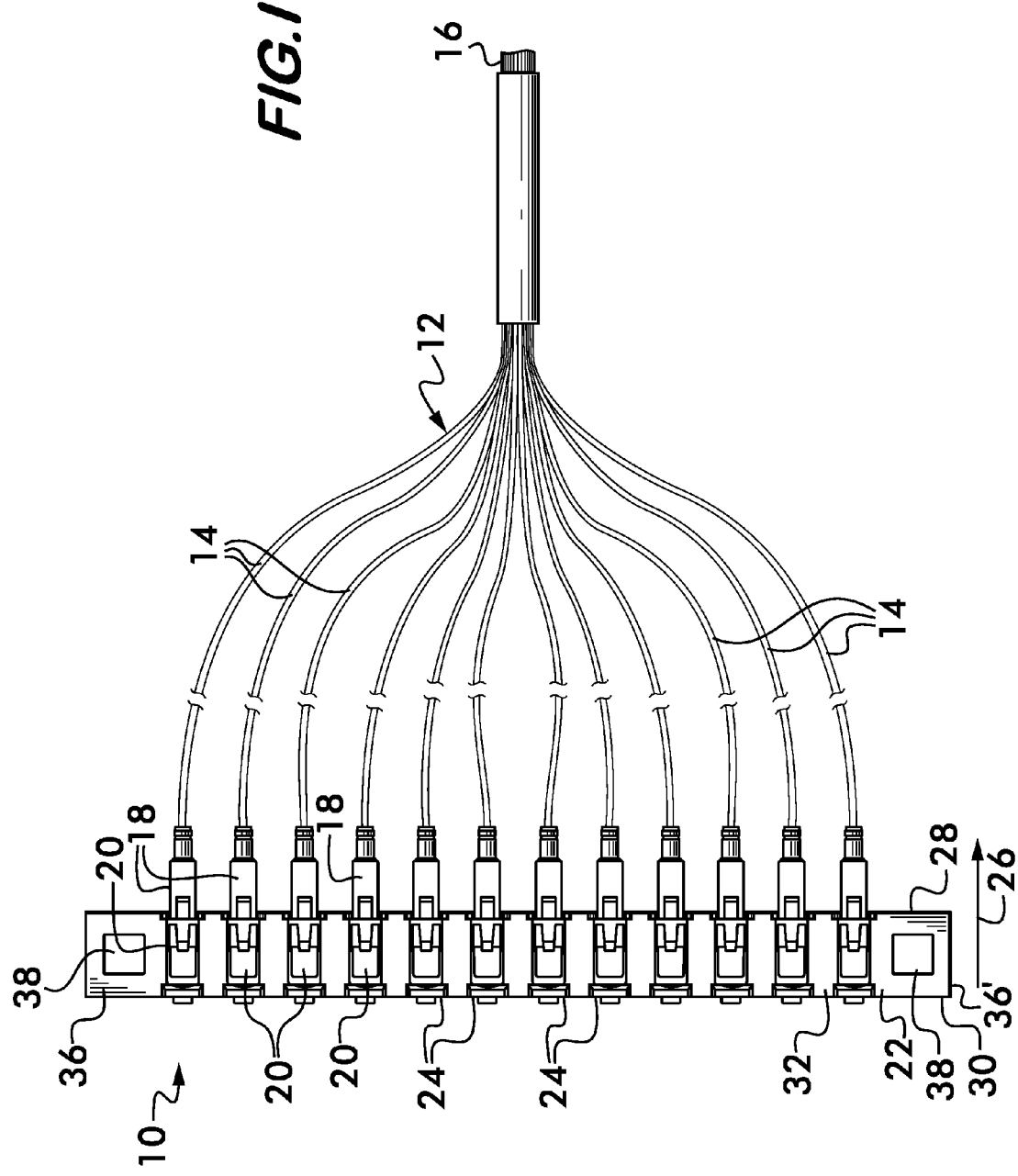
FIG. 1 is a plan view of a plurality of fiber optic cables of a fanout held in an organized array by the present invention, showing fiber optic connectors and respective dust covers.

In the drawings, like numerals indicate like elements throughout. Certain terminology is used herein for convenience only and is not to be taken as a limitation of the present invention. The terminology includes the words specifically mentioned, derivatives thereof and words of similar import. The terms and expressions used herein, and the embodiments illustrated below, are not intended to be exhaustive or to limit the invention to the precise form disclosed. These terms, expressions and embodiments are chosen and described to best explain the principle of the invention and its application and practical use and to enable others skilled in the art to best utilize the invention.

With initial reference to FIG. 1, a preferred device 10 for organizing the connector ends of fiber optic cables is now described. For illustration purposes, the organizing device 10 is described as used with a fanout array 12 of optical fiber cables 14 extending from a cable bundle 16, each cable 14 being terminated to a respective fiber optic connector 18 within a removable dust cover 20 which is to be held in an organized manner.

Figure 2:
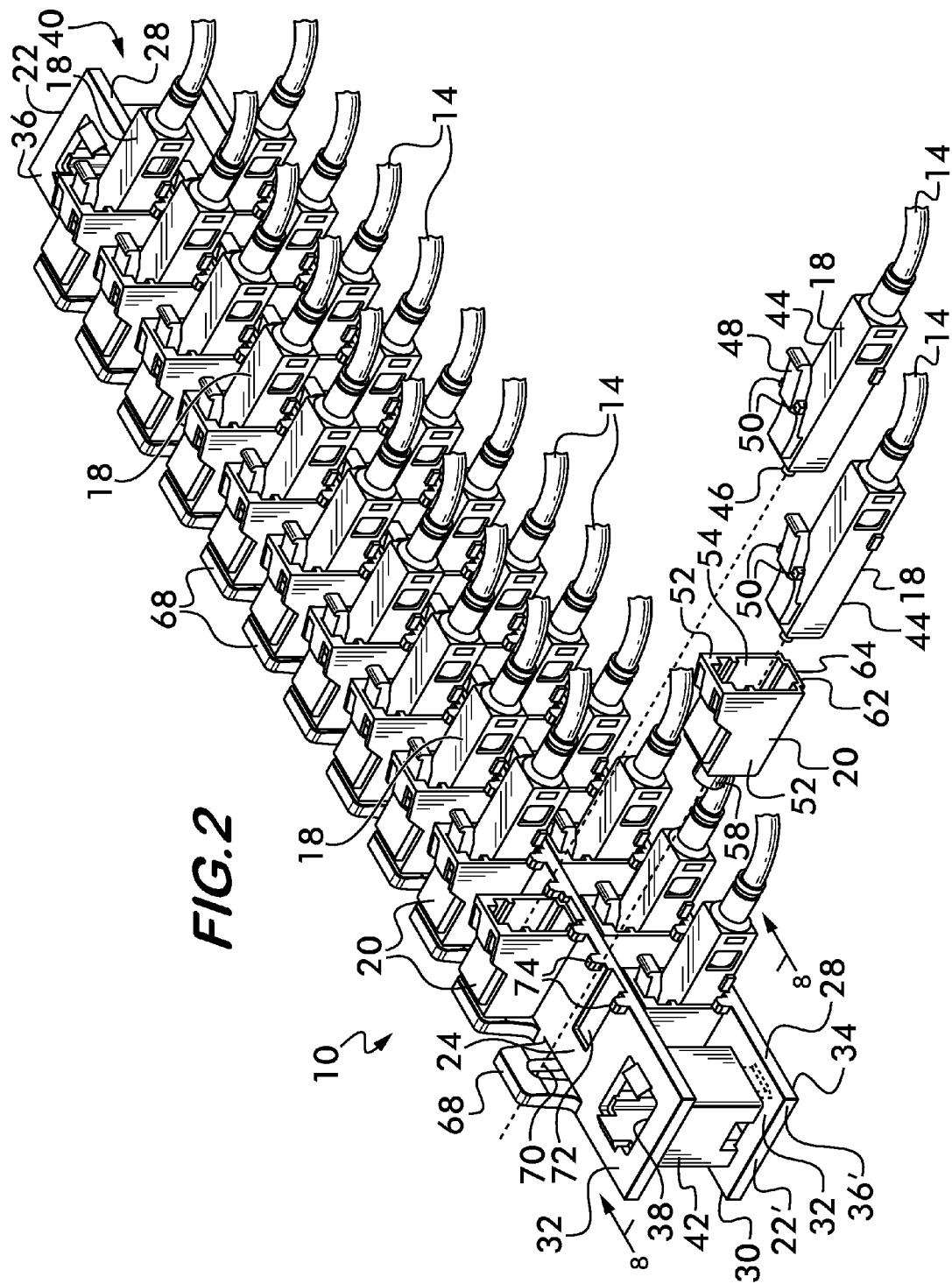
FIG. 2 is an isometric front view of a stack of two organizers of FIG. 1, illustrating a fiber optic connector terminated to a coupling end of an optical fiber, and a respective dust cover therefor.

The organizing device 10 includes an elongated base plate 22 defining an array of mounting sites 24 for retaining the fiber optic connector dust covers 20. In the illustrated embodiment, the base plate 22 of the device 10 provides an array of twelve (12) mounting sites 24, each individual mounting site 24 retaining a single fiber optic connector dust cover 20. Received within each dust cover 20 is the coupling end of a respective fiber optic connector 18 so as to be removably secured therein as is known in the art (see the lower central portion of FIG. 2 showing a dust cover 20 and connector 18). This arrangement maintains the fanout 12 in an organized array during manufacture, shipping and handling thereof until the customer installs the optical fiber cables for in-service use, thus preventing entanglement and snarling of the individual optical fiber cables 14.

As will be described in more detail below, each fiber optic connector 18 can be removed from its respective dust cover 20, thereby leaving the dust cover 20 mounted to the device 10 at its respective mounting site 24, or in the alternative, the dust cover 20/fiber optic connector 18 combination can be removed as a unit from the device 10, leaving the dust cover 20 to protect the connector 18 until the dust cover is removed. In the embodiment of FIG. 1, the array of dust cover mounting sites 24 is configured to form a singular horizontal row of dust covers all facing a common direction 26. The base plate 22 further includes a front side 28 and back side 30, upper side 32 and underside 34 (see FIG. 2), and opposed ends 36, 36' having square shaped apertures 38 therethrough which will be discussed further below. For purposes of describing the device 10, the device is shown and described as extending horizontally, it being appreciated that the device 10 is not so limited and can be positioned and used in any orientation.

Figure 3:
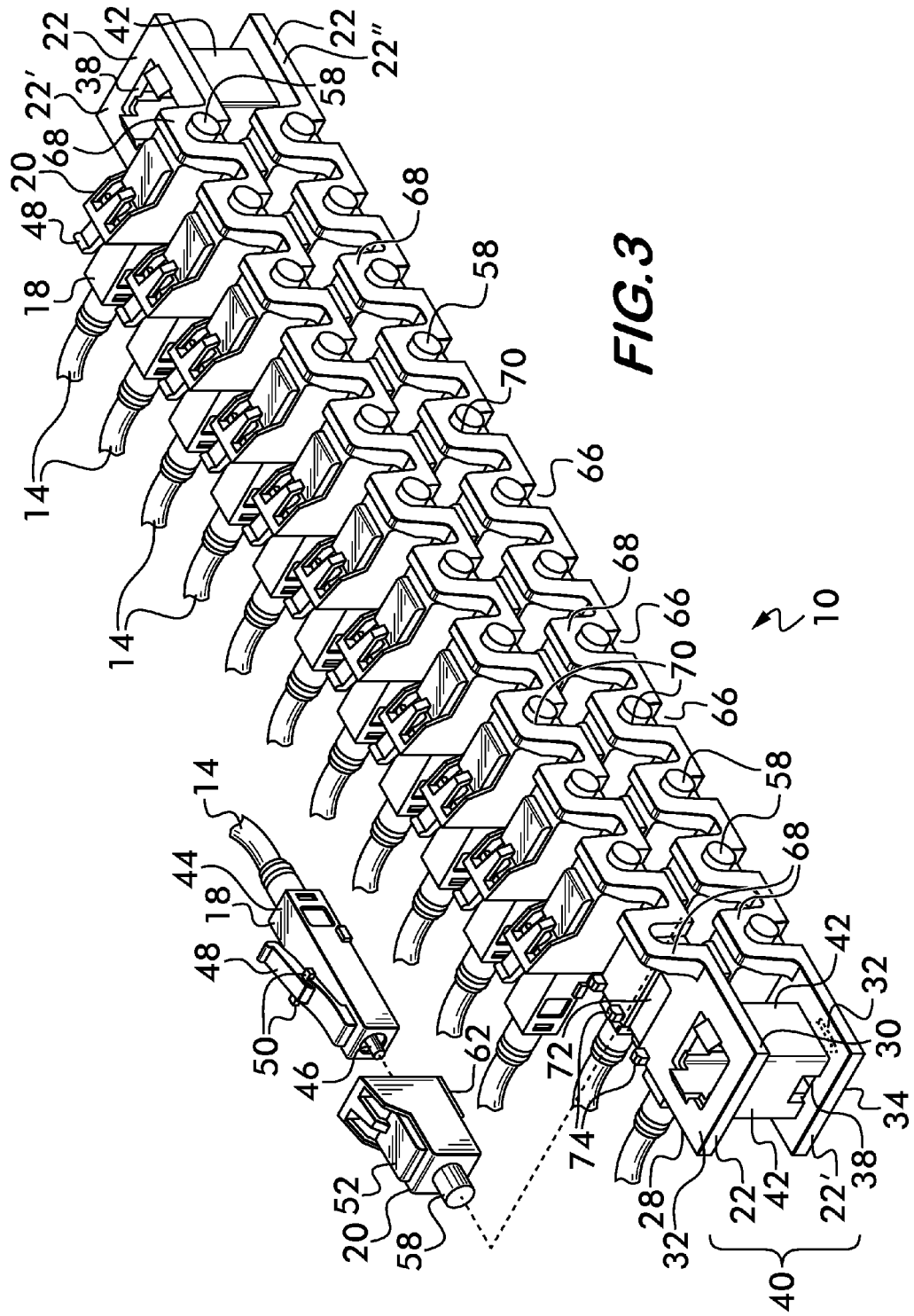
FIG. 3 is an isometric rear view of the stack of two organizers of FIG. 2, illustrating a fiber optic connector terminated to a coupling end of an optical fiber, and a respective dust cover therefor.

With further reference to FIGS. 2 and 3, the device 10 is expandable to include additional base plates 22 (upper base plate being designated 22', lower plate 22" to distinguish them) for retaining additional dust covers 20. Shown is a pair of base plates 22 of the present invention, assembled into a stack 40 secured together using a pair of spacers 42, one at each base plate end 36, 36'. In the illustrated embodiment, each base plate 22 is identical to one another. As with the device 10 of a single base plate 22 as shown in FIG. 1, optical fiber cables 14 extend from respective fiber optic connectors 18 secured in respective dust covers 20 which are mounted to the base plates 22 at respective mounting sites 24. As will be further discussed below, additional base plates 22 can be added to the stack 40 for retaining as many cables as desired. Described next, however, is the configuration of the individual mounting sites 24 for retaining the dust covers 20 to the device 10.

With particular reference to FIGS. 2 (lower center), 3 (upper left side) and 4, the fiber optic connectors 18 are of a known type in commercial use, as are the dust covers 20. The connectors 18 includes a housing 44 around the exposed termination end 46 of the fiber optic cable 14 which extends beyond the connector 18, the connector being capable of mating with a complimentary shaped connector or dust cover 20 as is known in the art. The connector housing 44 includes a conventional latching system having a latch arm 48 which is deflectable resiliently downward to latch and unlatch the connector 18 from the dust cover 20 when desired. The latch arm 48 resiliently returns to its normal position and includes side projections 50 which retain the connector 18 to the complimentary connector or dust cover 20. Each dust cover 20 is shaped to receive the connector 18 within it, having a housing 52 defining an opening 54 in its front end which is configured to receive the connector 18 therein, and a cylindrical protuberance 58 extending from its back configured to surround and protect the fiber optic termination end 46 of a respective optical fiber. Each dust cover 20 also includes internal stops 60 within the opening 54 for engaging and retaining the side projections 50 of the connector latching arm 48 within it (FIG. 4), and also includes a bottom protruding section 62 (FIGS. 2 and 3).

With particular reference to FIGS. 2, 3 and 7, each mounting site 24 includes a retaining arm 68 projecting upwardly from the upper surface 32 adjacent the back side 30 the base plate 22 and which includes an opening 70 (FIGS. 2 and 3) for receiving and cooperating with the protuberance 58 of a dust cover 20; a recess 72 in the upper surface 32 into which the dust cover bottom protruding section 62 nests when mounted; and at least one stop projection 74 extending upwardly (preferably a pair as shown) from the upper surface 32 along the front side 28 spaced from the retaining arm 68 for cooperating with the front end of the dust cover 20 when mounted. The retaining arm opening 70 includes a slotted opening 66 provided at the back edge of the base plate 22 (see FIG. 3) to allow clearance for the dust cover protuberance 58. The retaining arm 68 further includes an upper stop surface 76 (see FIG. 4) that is at a slight angle as compared to a lower stop surface 78 (to the sides of the slotted opening 66) to provide a tolerance for pivotal movement of the cover 20 into and out of mounting site 24, the lower stop surface 78 being substantially perpendicular to the upper surface 32 of the base plate 32. The stops 74 extend preferably substantially perpendicularly from the upper surface 22. The retaining arm 68, recess 72, and stops 74 cooperate with the dust cover 20 to retain the dust cover 20 to the mounting site 24, preferably in a snap-fit or friction fit manner, thus securing the dust cover 20 to the base plate 22, as well as the fiber optic connector 18 and respective optical fiber 14. Each base plate 22 includes an array of such mounting sites 24. The base plate 22, retaining arms 68, and stops 74 are preferably made from a suitable material such as a unitary piece of molded plastic.

Figure 8:
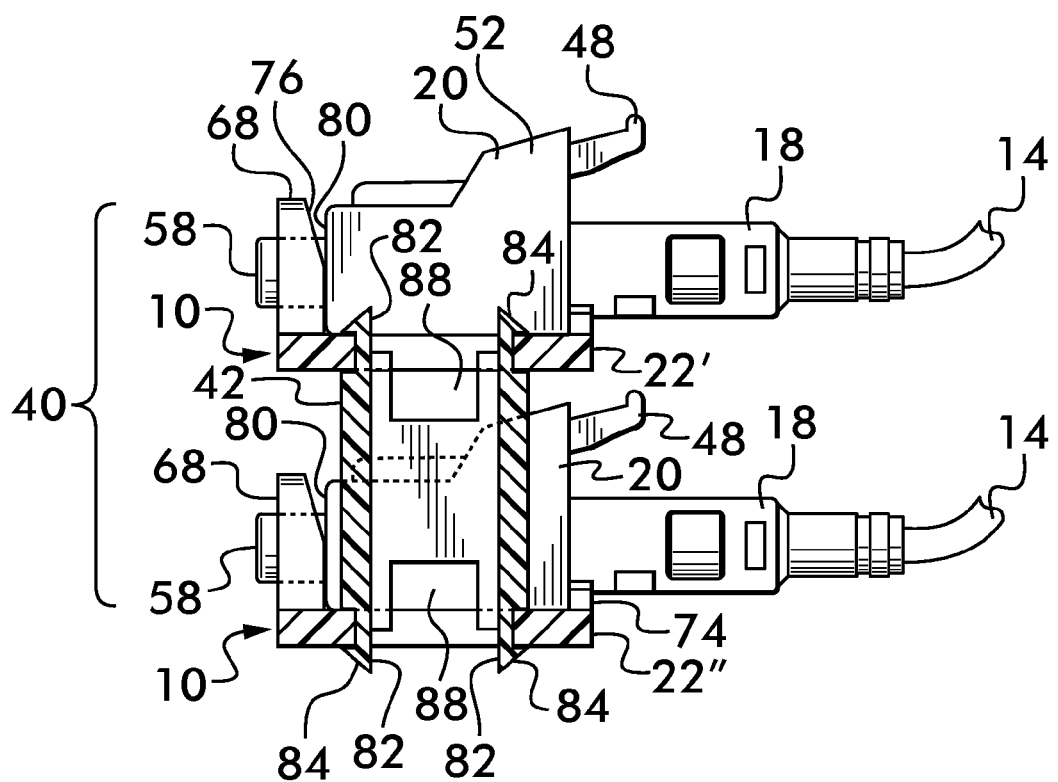
FIG. 8 is a cross-sectional view taken along line 8-8 of FIG. 2, showing details of the stacking spacer of the present invention.

With particular reference to FIGS. 4, 5, 7 and 8, the mounting of a dust cover 20 to the device 10 at a mounting site 24 is now described. A fiber optic connector 18 is shown in combination with a dust cover 20, having been inserted or "snapped" into the dust cover 20 such that the latch arm 48 engages the inside of the dust cover 18 to be retained therein as is known in the art. As best seen in FIG. 5, the dust cover 20/connector 18 combination is maneuvered by the user into the mounting site 24, inserting the dust cover protuberance 58 at an angle through the opening 70 in the retaining arm 68 until the rear face 80 on the back side of the dust cover 20 engages the retaining arm 68, preferably along the angled upper portion 76. The dust cover 20 is then pushed downwardly such that a peripheral front lower edge surface 64 of the dust cover 20 frictionally snaps past the stops 74 into its retained position in the mounting site 24 as shown in FIGS. 4, 7 and 8, the stops 74 holding the cover 20 in place against the retaining arm 68 with the protuberance 58 held within the opening 70 of the retaining arm, and the bottom protrusion 62 nested into the recess 72. A respective dust cover 20 can be mounted into each of the mounting sites 24 in a similar manner, either by itself or in combination with a fiber optic connector 18. If the dust cover 20 is mounted to the device 10 by itself, the connector is easily inserted into the mounted dust cover to be retained therein. The fiber optic connector 18 can be easily removed from the mounted dust cover 20 by depressing the latch arm 48 as is known in the art, or the entire dust cover 20/connector 18 combination (or the dust cover by itself after the connector has been removed) can be removed simply by reversing the steps set forth above for mounting the dust cover to the device 10, i.e., with reference to FIG. 5, the dust cover 20 is pushed upwardly such that the cover's peripheral front lower edge surface 64 moves upwardly past the stops 74 and then moving the dust cover protuberance 58 toward the right as oriented in FIG. 5 out of the retaining arm opening 70. FIG. 4 also illustrates a connector 18 being delatched from its respective cover 20.

Figure 9:
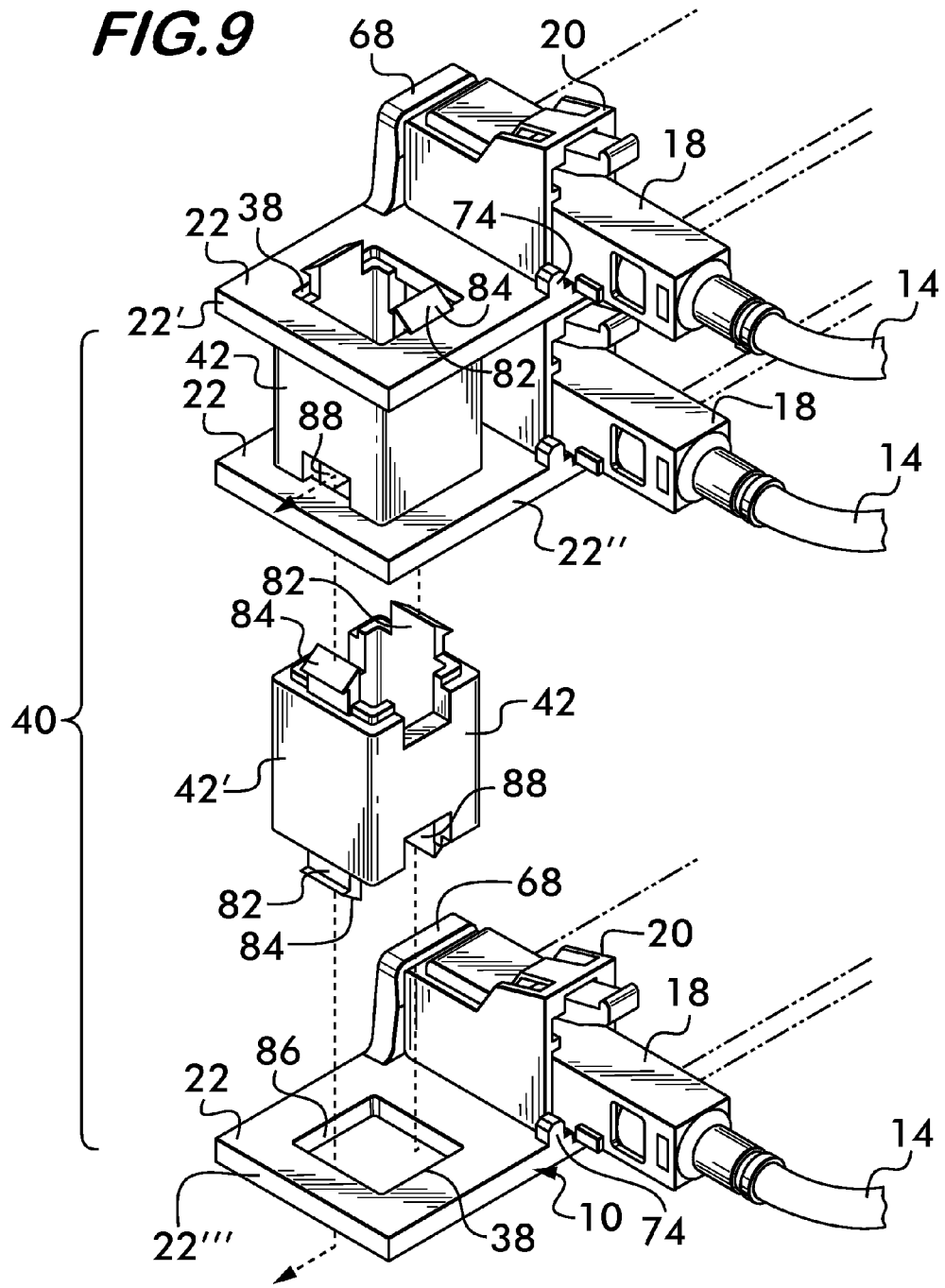
FIG. 9 is an isometric view of the stack end of FIGS. 6 to 8, exploded from a third organizer and an additional stacking spacer.

With reference to FIGS. 2, 3, 6, 7 and 8, the feature allowing the addition of multiple base plates 22 (upper base plate designated 22', lower plate 22") to increase the number of mounting sites 24 is now described. In the preferred embodiment, two spacers 42 are used to attach two base plates 22', 22" to one another, one spacer 42 at each base plate end 36, 36'. With particular reference to FIGS. 7 and 8, each spacer 42 is generally rectangular in shape and square in cross section and has a latch section formed in the illustrated embodiment as a pair of resilient latch arms 82 positioned at top and bottom ends of the spacer. The latch arms 82 cooperate with corresponding latch sections on the base plates 22, here formed by the openings 38. The latch arms 82 are configured to snappingly latch into respective base plate openings 38 when pushed therein, the latch arms 82 having angled faces 84 the allow the arms 82 to move inwardly when forced against the opening side walls 86 as is known in the art, the arms 82 resiliently moving back to their initial position to lock the spacer 42 in place as shown in FIGS. 7 and 8. The spacer 42 includes a pair of side recesses 88 at opposite ends adjacent the latching arms 82. With particular reference to FIG. 9, it is seen that the recesses 88 allow clearance for the latch arms 82 of another spacer 42' used to add a third base plate 22, here designated 22'''. Here, the second or lower spacer 42' is rotated 90 degrees compared to the upper spacer 42 so that the latch arms 82 of the second spacer 42' can latch within the opening 38 and in the recess 88 without interference from the latch arms of the upper spacer 42 already latched within the same opening 38. It is appreciated that additional base plates can be added by use of spacers rotated 90 degrees as compared with the adjacent spacer. The spacers 42 are preferably made of the same material as the base plates 22, e.g., molded plastic.

The present invention thus provides an economical means of managing the unsecured ends of fiber optic cables. Multiple base plates 22 can be stacked for as many cables as needed. Moreover, the fiber optic connectors 18 can be removed from the device 10 with or without its respective dust cover 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A device for organizing an array of fiber optic connectors by receiving dust covers for the fiber optic connectors, said device comprising:
    an elongated base plate defining an array of sites for retaining the fiber optic connector dust covers, the base plate having first and second ends;
    each of said sites being configured to receive one of said dust covers, said dust covers being removably mountable to the base plate at said sites; and
    a pair of stacking spacers securable to said ends of said base plate to extend upwardly therefrom, said stacking spacers further being securable to a second said base plate configured to mount dust covers thereto, thereby enabling stacking of the two said base plates into a multi-level array of fiber optic connector dust cover sites;
    wherein each of said stacking spacers includes latching sections cooperable with corresponding latching sections of at least one of said two base plates to be securable thereto, and wherein each of said stacking spacers includes a pair of opposed latching arms extending from first and second opposing ends of said stacking spacers for latching with the corresponding latching sections of each said base plate.

2. The device of claim 1, wherein all said dust covers face a common direction when mounted to said base plate.

3. The device of claim 1, wherein said array of sites form a horizontal row.

4. The device of claim 1, wherein latching sections of each said base plate comprise an aperture disposed at said ends of each said base plate each for receiving said respective pairs of latch arms, said latch arms being resilient so as to bend inwardly and then resiliently return towards its original position to engage said aperture.

5. The device of claim 4, wherein each said aperture is rectangular defining two sets of opposed side edges, and one of said pairs of latch arms latches to one of said sets of opposed side edges.

6. The device of claim 4, wherein each of said stacking spacers is configured to define a clearance such that upon being mounted to a said end of said base plate, said clearance thereby permits an additional said stacking spacer vertically positioned with respect to said stacking spacer to latch with said corresponding latching section of said base plate.

7. The device of claim 6, wherein said clearance enables said latching when said additional stacking spacer is rotated 90 degrees with respect to said stacking spacer.

8. An assembly comprising said base plate of claim 1 and at least one said fiber optic connector dust cover mounted thereto at a respective said site.

9. An organized arrangement of optical fiber cables, comprising:
    a device according to claim 1;
    a plurality of optical fiber cables;
    a like plurality of fiber optic connectors terminated to coupling ends of respective ones of the optical fiber cables; and
    a like plurality of dust covers removably mounted to ends of respective ones of the fiber optic connectors;
    wherein each said dust cover is removably mounted to a respective said site of said base plate.

10. The organized arrangement of claim 1, further comprising at least a second said base plate assembled to said base plate by stacking spacers and being superposed thereabove and parallel thereto.

11. A device for organizing an array of fiber optic connectors by receiving dust covers for the fiber optic connectors, said device comprising:
    an elongated base plate defining an array of sites for retaining the fiber optic connector dust covers, the base plate having first and second ends; and
    each of said sites being configured to receive one of said dust covers, said dust covers being removably mountable to the base plate at said sites;
    wherein at least one of said dust covers includes a front side for receiving the fiber optic connecter therein and a back side opposite said front side, and wherein at least one of said dust cover sites includes a retaining arm extending upwardly from said base plate and which is configured to engage said back side of said at least one dust cover for retaining said at least one dust cover to said device, and wherein said back side of said at least one dust cover includes a protuberance extending therefrom, and said retaining arm is configured to receive and engage said protuberance.

12. The device of claim 11, wherein said retaining arm includes an opening for receiving said protuberance therein.

13. The device of claim 11, wherein said base plate includes, at said at least one of said sites, at least one upwardly projecting stop member spaced from said retaining arm so as to be engageable with the front side of said at least one dust cover such that, when said at least one dust cover is positioned in said at least one site, said at least one stop member in cooperation with said retaining arm secures said at least one dust cover to said at least one site.

14. The device of claim 13 further comprising a second upwardly projecting stop member spaced from said retaining arm and spaced from said first stop member so as to be engageable with the front side of said at least one dust cover and thereby cooperate to secure said dust cover to said at least one site.

15. The device of claim 13 wherein said dust cover snap-fits to said base plate via said retaining arm and said stop member.

16. A device for organizing fiber optic connectors attachable to respective dust covers, said device comprising:

an elongated base plate; and a plurality of mounting sites on said base plate for retaining the fiber optic connector dust covers thereto, each of said mounting sites having a retaining arm extending from said base plate and a stop extending from said base plate spaced from said retaining arm, said retaining arm and said stop projection engaging and cooperating with front and back sides of one of said dust covers to removably retain said one dust cover to said base plate at said mounting site;

wherein said back side of at least one of said dust covers includes a protuberance extending therefrom, and said retaining arm of at least one of said mounting sites is configured to receive and engage said protuberance.

\* \* \* \* \*